Figure 1:
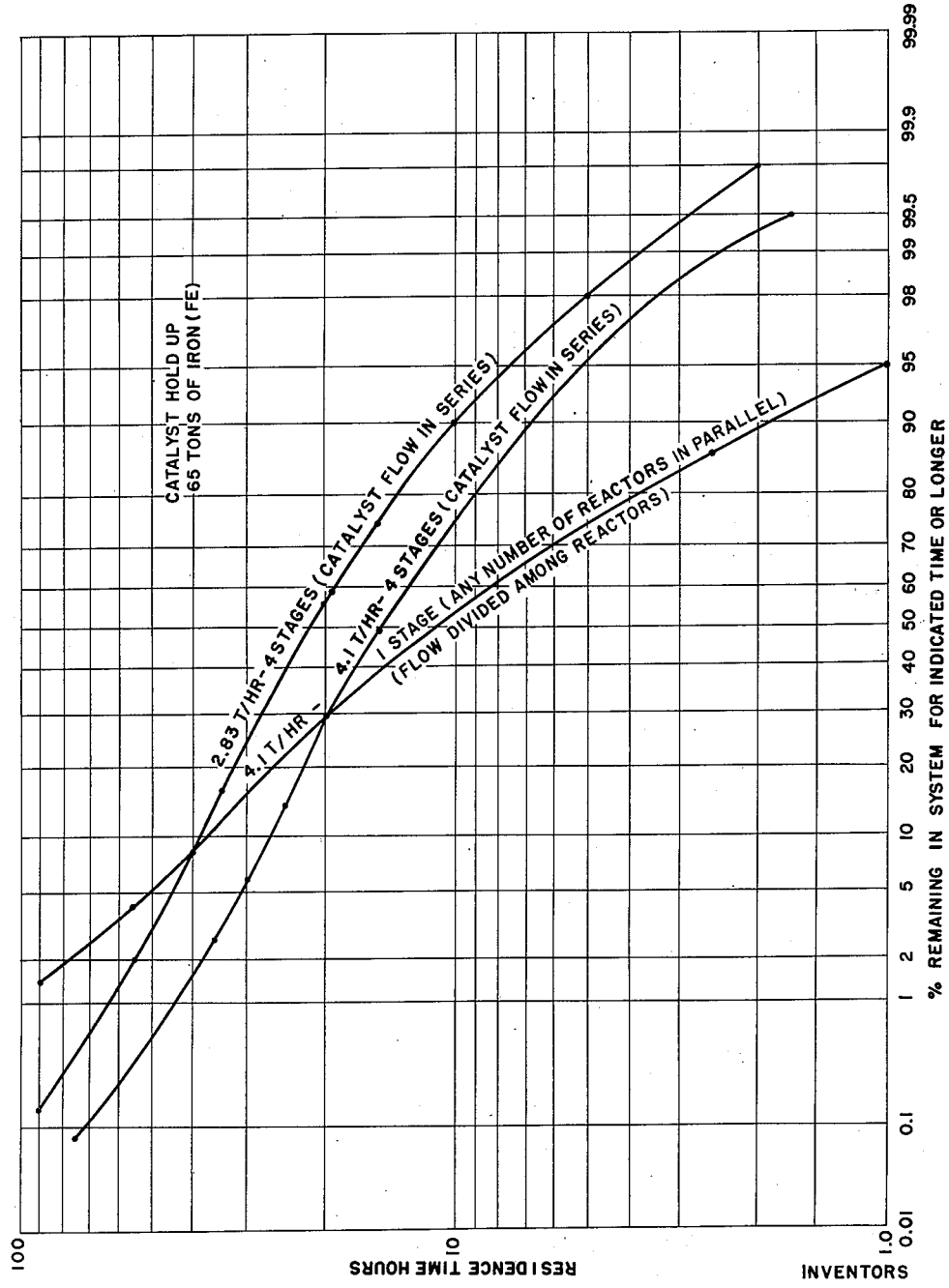
Figure 2:
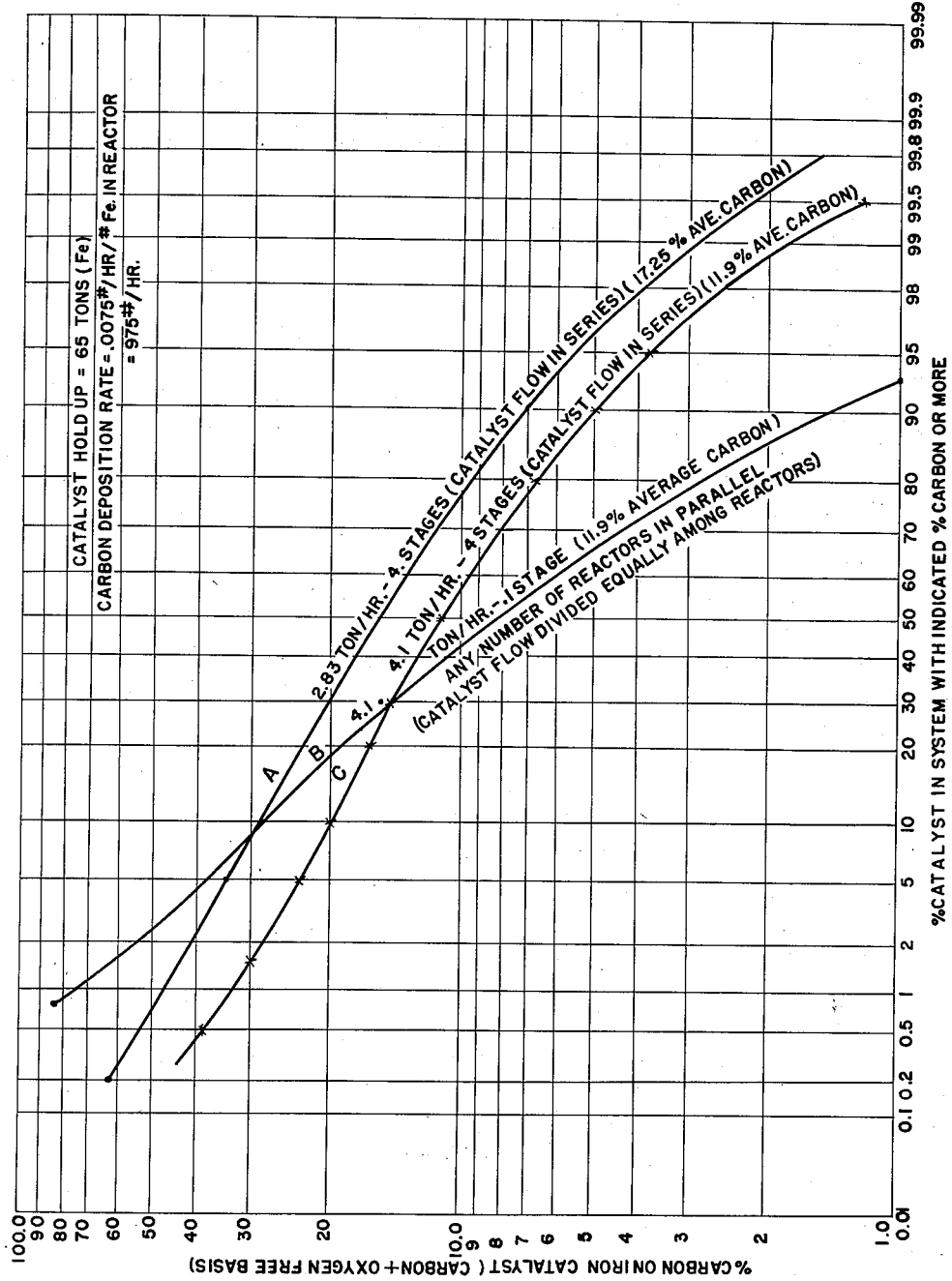
Figure 3:
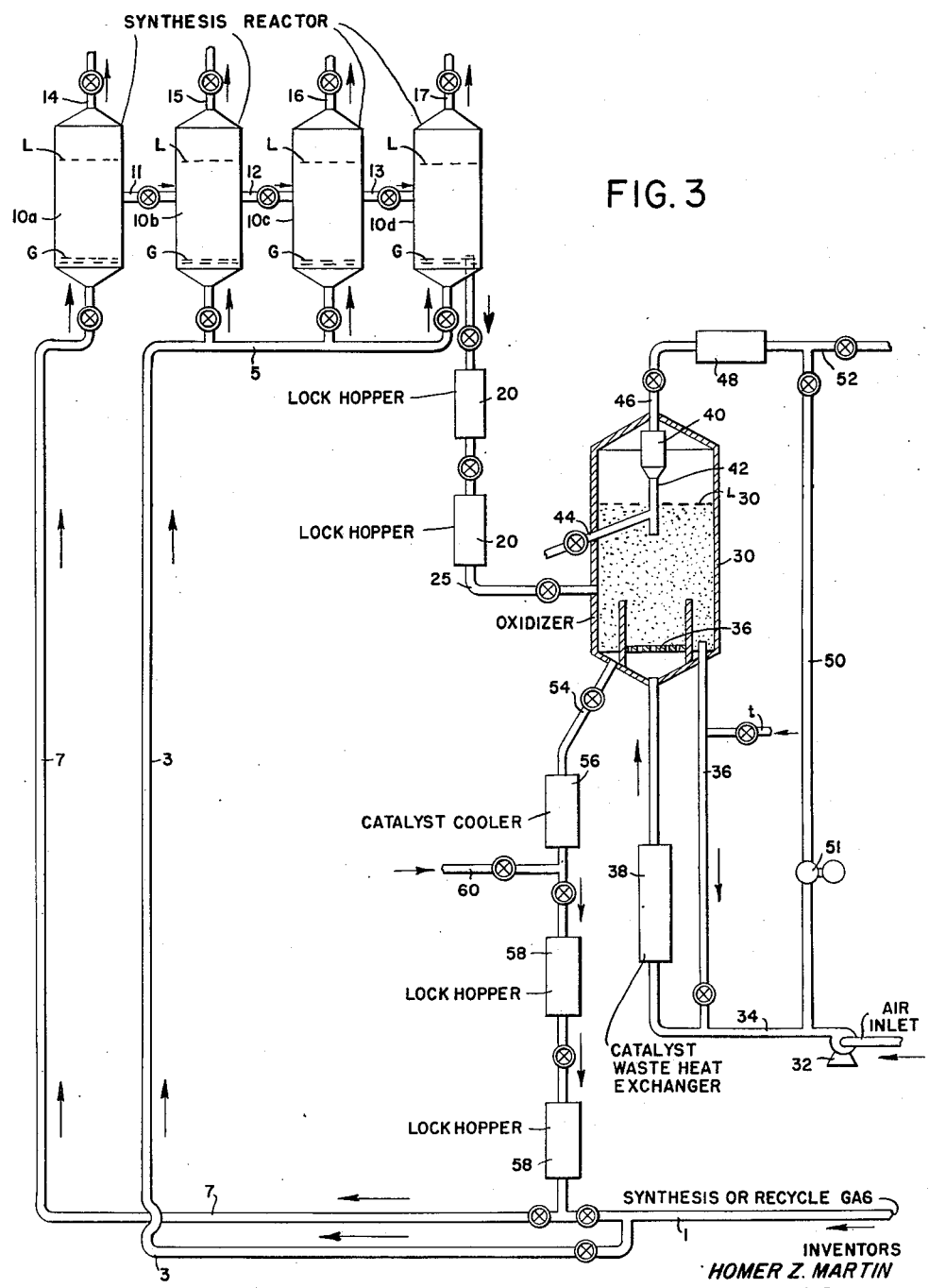
Figure 4:
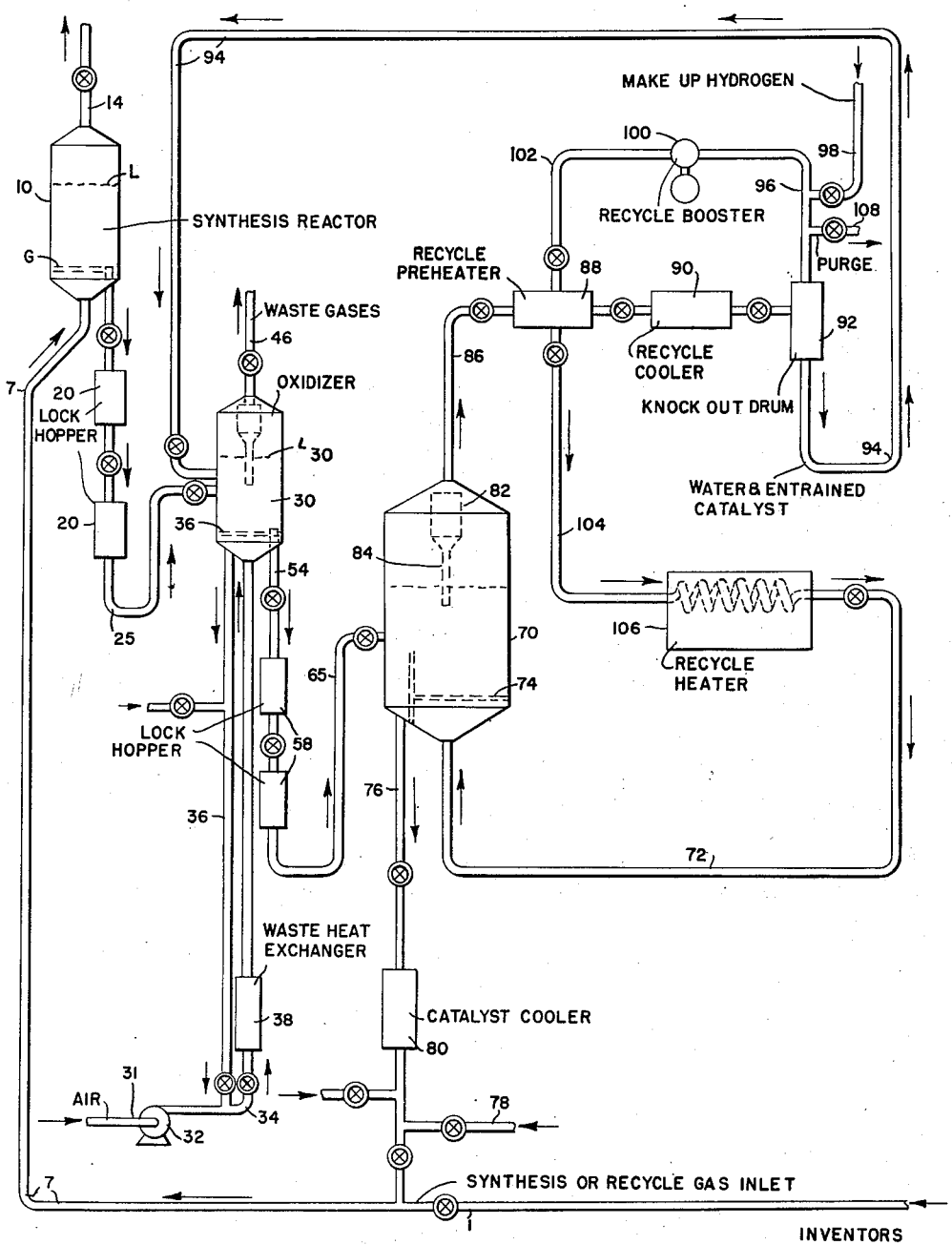

Patented Sept. 16, 1952

2,610,976

UNITED STATES PATENT OFFICE 2,610,976

HYDROCARBON SYNTHESIS

Homer Z. Martin, Roselle, and Ivan Mayer, Summit, N. J., assignors to Standard Oil Development Company, a corporation of Delaware Application November 28, 1947, Serial No. 788,537

9 Claims. (Cl. 260—449.6)

This invention relates to the catalytic conversion of carbon oxides with hydrogen to form valuable synthetic products. The invention is more particularly concerned with an improved method of employing and reconditioning finely divided catalysts having a high activity and selectivity for the formation of normally liquid hydrocarbons in the catalytic conversion of carbon monoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product while at the higher temperatures (about 450°–750° F.) and higher pressures (about 5–25 atmospheres and higher) required for the production of unsaturated and branched-chain products of high antiknock value, iron-type catalysts are more suitable.

In both cases, the reaction is strongly exothermic and the utility of the catalyst declines steadily in the course of the reaction partly due to the deposition of non-volatile conversion products such as carbon, paraffin wax, and the like, on the catalyst.

The extremely exothermic character and high temperature sensitivity of the synthesis reaction and the relatively rapid catalyst deactivation have led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties, particularly with respect to catalyst deposits and their detrimental effects on the fluidization characteristics and mechanical strength of the catalyst.

As stated above, one of the most important modifications of the hydrocarbon synthesis requires the use of iron-type catalysts. These catalysts are the outstanding representatives of a group of catalysts which combine a high synthesizing activity and selectivity toward normally liquid products with a strong tendency to carbonize during the synthesis reaction, that is, to form fixed carbon or coke-like catalyst deposits which can not be readily removed by conventional methods of synthesis catalyst regeneration such as extraction, reduction, or the like.

These carbon deposits, when allowed to accumulate, weaken the catalyst structure, which leads to rapid catalyst disintegration, particularly in fluid operation. The reduction of the true density of the catalyst resulting from its high content of low-density carbon coupled with the rapid disintegration of the catalyst particles causes the fluidized catalyst bed to expand, thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly, favoring further carbonization and accelerating the deterioration of the fluidity characteristics of the bed.

Prior to the present invention, it has been suggested to reduce the carbon content of catalysts of this type by withdrawing the carbonized material from the synthesis reactor and subjecting the same to a combustion treatment with free oxygen-containing gases to remove carbon in the form of carbon oxides. These treatments, when applied to fluid operation, require excessive catalyst circulation between reaction and regeneration zones as well as excessive quantities of oxidizing gases, reducing gases, and undesirably large regeneration equipment. Also, the combustion temperatures are usually excessive if substantially complete carbon removal is desired unless expensive means for heat removal are provided.

These difficulties are considerably aggravated in fluid operation because the individual particles making up the fluidized catalyst mass vary widely in carbon content, i. e. the withdrawn catalyst particles fall within the wide range of from carbon-free particles to particles of highest degree of carbonization. When a catalyst mass of this type is subjected to oxidative regeneration at conditions optimum for a catalyst of average carbonization, it will be appreciated that only a relatively small proportion of catalyst particles will be fully benefited by these optimum conditions while the major portion of the particles will be either over- or under-treated.

The present invention overcomes the aforementioned difficulties and affords various additional advantages. These advantages, the nature of the invention and the manner in which it is carried out will be fully understood from the following description thereof read with reference to the accompanying drawing.

In accordance with the present invention, the hydrocarbon synthesis using fluidized iron-type catalysts is carried out in a plurality of conventional fluid-type reactors through which the fluidized catalyst flows in series continuously or intermittently. Catalyst is withdrawn from the last reactor in the direction of catalyst flow, regenerated by a treatment comprising complete combustion of the carbonaceous deposits and usually some oxidation of the iron, and the regenerated catalyst is returned to the first synthesis reactor in the direction of catalyst flow. The synthesis gas may be passed through the synthesis reactors either in series or in parallel. When applying series flow of synthesis gas, it may be advisable to pass the synthesis gas countercurrently to the catalyst flow through the reactors. The advantages of this procedure are as follows.

Assuming that a given coke formation rate occurs in a fluid-type synthesis reactor, the larger the catalyst circulation rate through the regeneration system the lower will be the coke content of the spent catalyst. Large circulation rates of the catalyst are obviously expensive inasmuch as larger transfer means, such as lock hoppers, are required and, what is more important, more air is needed for regeneration since a larger quantity of iron is oxidized. Laboratory work has shown that when the carbon content approaches 30% or thereabout on iron catalyst, disintegration tends to become excessive. At concentrations substantially below this percentage, the carbon has little effect either on catalyst disintegration or on catalyst activity.

It will be understood that in a system such as described in which a stream of regenerated catalyst is charged to a fluid type synthesis reactor, not all of the particles of the catalyst will remain in this synthesis reactor for the same length of time. Some will remain for much less than average and some for a time much greater than average. Consequently, in order to operate in such a way that only a small fraction of the catalyst, say about 5%, has less than about 30% carbon it will be necessary to circulate sufficient catalyst to the regeneration system so that the average carbon concentration on the spent catalyst is much less than 30%. It will be observed then that one of the most serious problems encountered here is that of decreasing the catalyst flow rate.

When operating in accordance with the present invention, the catalyst particles withdrawn from the last synthesis reactor in the direction of catalyst flow will have a very nearly uniform carbon content approaching the average carbon content of particles withdrawn from a single reactor synthesis system after a residence time roughly corresponding to the total residence time of the catalyst particles in the plurality of synthesis reactors, provided the regenerated catalyst is returned to the synthesis reactor first in line in the direction of catalyst flow, in accordance with the invention. The more reactors in series the closer will be the approach of the carbon concentration on each particle to the average. As a result, catalyst circulation between the regeneration and reaction stages may be reduced without increasing the proportion of catalyst particles having a carbon concentration above the disintegration limit. When a sufficient number of stages is used, this proportion may even be substantially reduced. It follows that operation according to the invention permits a substantial reduction in the requirements of oxidizing and reducing gases as well as size of regeneration equipment.

These relationships will be best understood from an inspection of the curves shown in Figures I and II of the drawing.

Figure I illustrates the effect of catalyst circulation rate and plurality of reaction zones on the residence time distribution of the spent catalyst in the reaction stage, i. e. the percentages of catalyst remaining in the reaction stage for definite minimum times.

Figure II illustrates the effect of catalyst circulation rate and plurality of reaction zones on percent carbon on spent catalyst, based on the pure iron content of the catalyst, i. e. percentages of catalyst containing definite minimum quantities of carbon.

The curves of Figures I and II are based on a coke production of 975 lbs. per hour and a catalyst hold-up based on iron, of 65 tons. The following comparison may be derived from these curves.

| Curve No. | Iron Circulation Rate, Tons Per Hour | No. Stages in Series | Percent Iron Having More Than 30% C | Ave. Percent C on Iron | Air Requirements (MSCFH) | Hydrogen Requirements for Catalyst Reduction (MSCFH) |
|---|---|---|---|---|---|---|
| A | 2.83 | 4 | 8.0 | 17.25 | 211 | 72 |
| B | 4.1 | 1 | 8.0 | 11.9 | 252 | 105 |
| C | 4.1 | 4 | 1.5 | 11.9 | 252 | 105 |

Curves A and B indicate that 8.0% of catalyst is in the disintegration range for both curves, i. e. above 30% C. The 4 stage operation A is at a lower circulation rate. Hence, in operation A less oxygen is consumed by oxidation of the iron associated with the coke, which results in a substantially reduced overall oxygen requirement.

Comparison of curves B and C, which are for the same circulation rate of 4.1 tons per hour, indicates that the same amount of oxygen is required. However, the 4 stage process (C) has only 1.5% of the spent catalyst in the disintegration range (above 30% C) as compared with 8% for curve B.

It has been pointed out heretofore that the oxidation regeneration treatment is preferably carried to a complete decarbonization of the catalyst. This may involve an oxidation of the iron component beyond the degree desirable for an efficient operation of the synthesis stage. The catalyst may also contain an undesirably high oxygen concentration when it leaves the synthesis stage. In these cases, the catalyst, after carbon removal and prior to its return to the synthesis stage, may be reduced at least in part, as indicated in the above table. This separate reduction stage is preferably conducted at an elevated pressure approximating that at which the synthesis is carried out. Hydrogen is the preferred reducing agent. Water formed during the reduction reaction should be removed from the system, which may be best accomplished by drying the effluent gases from the reduction reactor and recycling the dried gases. This operation is greatly aided by high pressures because the condensation of water is facilitated.

The need of a separate reduction stage may be avoided by so controlling the oxidation conditions in the oxidative regeneration zone that the carbonaceous deposits are removed in the form of carbon oxides either without affecting the state of oxidation of the iron or even with a simultaneous reduction of iron oxide to iron. This may be accomplished by properly correlating the amount and composition of the oxidizing gas with the temperature and pressure of the regeneration zone and the partial pressures of the components of the oxidizing atmosphere in contact with the catalyst. This type of operation is disclosed and claimed in the copending Martin, Mayer and Tyson application, Serial No. 788,538, filed November 28, 1947, now Patent No. 2,562,804 (P. M. 24,405 et al.) filed of even date herewith and assigned to the same interests, which is here expressly referred to for all necessary details.

It may also be desirable to subject the regenerated catalyst to a carbiding treatment prior to its return to the synthesis stage. This may be advantageously accomplished by contacting the regenerated catalyst, preferably after reduction, with CO-containing gases at relatively low CO-partial pressures, of preferably less than 1 atmosphere and temperatures of about 500°–800° F. Conditions should be so controlled that the atmosphere in contact with the catalyst is non-oxidizing with respect to iron and its carbides and that about 20–50% of the iron is converted to iron carbides.

Having set forth its objects and general nature, the invention will be best understood from the more specific description hereinafter in which reference will be made to Figures III and IV of the accompanying drawing, wherein:

Figure III is a semi-diagrammatical illustration of a system suitable for carrying out a preferred embodiment of the invention; and Figure IV is a similar illustration of a system involving a separate catalyst reduction stage.

Referring now to Figure III, the system illustrated therein essentially comprises a series of conventional fluid type synthesis reactors $10a$, $10b$, $10c$ and $10d$ and an oxidizer regenerator $30$ whose functions and cooperation will be forthwith explained.

In operation, synthesis reactors $10a$, $10b$, $10c$ and $10d$ contain a dense, turbulent, fluidized mass of iron catalyst such as sintered pyrites ash promoted with about 1.5% of potassium carbonate. Synthesis feed gas containing about 0.8–3.0 volumes of $H_2$ per volume of CO is supplied from line 1 through line 3, manifold 5 and line 7 to the various synthesis reactors which are arranged for parallel flow with respect to the gas feed in the case of the present example. As indicated by lines 11, 12 and 13 the catalyst is passed through the synthesis reactors in series from reactor $10a$ through $10b$ and $10c$ to reactor $10d$ from which it is withdrawn and returned to reactor $10a$ as will appear more clearly hereinafter. Any conventional means for conveying finely divided solids such as aerated standpipes, lockhoppers, mechanical conveyors, etc. (not shown) may be used in a manner known in the art to maintain the desired catalyst flow between the reactors.

The reaction conditions in the synthesis reactors are those known for the conversion of CO and $H_2$ on fluidized iron catalysts. They may include pressures of about 5–50 atm., preferably 20–40 atm., temperatures of about 500°–800° F., preferably about 550°–700° F., total gas throughputs of about 5 to 500 v./w./hr., preferably about 10 to 50 v./w./hr. and superficial gas velocities of about .3–5.0 ft. per second, preferably about .5–1.5 ft. per second for catalyst particle sizes of about 20–150 microns, predominantly about 50–100 microns. The synthesis gas enters the lower portion of the synthesis reactors through suitable distributing means such as grids G. Vaporous and gaseous reaction products and unconverted reactants are withdrawn overhead from catalyst levels L through lines 14, 15, 16 and 17 to be worked up in a conventional product recovery system (not shown). If desired, tail gas may be recycled to the reactors in conventional ratios of about 1–5 volumes, preferably 1–2 volumes of tail gas per volume of fresh synthesis gas. Other details of the operation of fluid synthesis reactors are well known and need not be further specified here.

As stated before, carbon deposits form on the catalyst in the synthesis reactors and in about 100 hours of catalyst residence time as much as 50% of carbon may be deposited on each 100 lbs. of catalyst. This will tend to diminish the activity of the catalyst and also cause its physical disintegration so that fines in excessive quantities will be formed. If this condition is not corrected, the density of the catalyst phase will drop rapidly and the active catalyst will be continually blown out of the synthesis reactors.

As a result of the series flow of catalyst through the synthesis reactors, the carbon content will increase in the direction of catalyst flow and will be lowest in reactor $10a$ and highest in reactor $10d$ because the catalyst maintained in reactor $10d$ has been subjected to carbonization conditions for the maximum time. It is an essential feature of the invention that the catalyst circulation rate through reactors $10a$, $10b$, $10c$ and $10d$ is so adjusted that the total catalyst residence time in reactors $10a$, $10b$, $10c$ and $10d$ is below that which will cause carbonization sufficient seriously to interfere with proper fluidization in any, and particularly the last one, of the synthesis reactors employed. While this total residence time depends on the specific reaction conditions employed, it may be stated that at a throughput of about 20 v./w./hr. total residence times of about 50 to 700 hrs., preferably 75–200 hrs., which may cause total coke deposits of about 10 to 20% by weight of iron, are suitable for the purposes of the invention at the conditions specified above.

The catalyst residence times within the individual reactors $10a$, $10b$, $10c$ and $10d$ may be equal or unequal fractions of the total catalyst residence time as desired. It is also noted that the reaction conditions in the individual synthesis reactors need not be identical. Allowances may be made for the steadily increasing age and degree of carbonization of the catalyst as it advances through the reactors. This may be compensated for by increasing the temperature in the direction of catalyst flow, for example. If series flow of synthesis gas is employed, the reaction conditions in the successive reactors may be adjusted to the changes in synthesis gas composition in a manner known per se for multi-reactor systems. It is also possible to operate the individual reactors at different conditions to produce products of different character in the individual reactors. The level L within any reactor is preferably maintained constant so as not to disturb the synthesis operation. The catalyst flow to, among and from the synthesis reactors may likewise be maintained at a substantially constant average rate.

Fluidized catalyst containing about 10.0 to 20.0% of carbon by weight of iron in substantially uniform distribution over the individual particles is withdrawn downwardly through a system of lockhoppers 20 wherein the pressure may be reduced to atmospheric at which the catalyst may be charged through line 25 to regenerator 30. An oxidizing gas, such as air, is supplied by blower 32 through line 34 to the bottom of regenerator 30 which it enters through a distributing means, such as grid 36, at a velocity of about .5–3 ft. per second to regenerate and convert the catalyst within reactor 30 into a dense fluidized mass having an upper level $L_{30}$. About 25 to 75 normal cu. ft. of air per pound of iron on the catalyst is normally sufficient substantially completely to burn off the carbon from the catalyst, taking into consideration the oxygen consumed by simultaneous iron oxidation. Temperatures of about 900°–1800° F., preferably about 1000° to 1200° F., are suitable.

The regeneration reaction is exothermic and heat must be removed from the catalyst mass to maintain it at the desired temperature. This may be accomplished by a suitable recycle of cooled flue gases, and, if necessary, any additional heat withdrawal means, such as cooling coils or jackets (not shown). It is preferred, however, to employ a catalyst circulation from regenerator 30 downwardly through line 36 to air feed line 34 and through a cooling means, such as waste heat exchanger 38, back to regenerator 30.

The flue gas leaving $L_{30}$ overhead may be passed through a conventional gas-solids separation system 40 which may include cyclones, precipitators and/or filters and from which separated catalyst fines may be returned through line 42 to regenerator 30 or discarded through line 44. The gas, now substantially free of entrained solids, may be passed through line 46 to a cooling means, such as a waste heat exchanger 48 and line 50 provided with blower 51, back to air feed line 34 as indicated above. Excess flue gas may be vented through line 52.

Catalyst substantially completely decarbonized is withdrawn downwardly through bottom draw-off line 54 and cooler 56 to be cooled to about 400°–600° F. and to be passed via a lockhopper system 58 to synthesis gas feed line 7. The catalyst suspended in the synthesis gas in line 7 is returned to synthesis reactor 10a to repeat the cycle.

The system illustrated by Figure III permits of various modifications. For example, certain iron catalysts tend to sinter under the above described decarbonization conditions, which interferes with a proper fluidization of the catalyst in regenerator 30. In these cases, regenerator 30 may have the form of a rotary kiln to which the oxidizing gas is charged. Heat may be removed by recycling a cooled portion of the flue gas to the kiln, or by recycling cooled catalyst to the kiln, or by quenching within the kiln with water. The regeneration may also be carried out at elevated pressures, if desired, so that pressure reduction on the catalyst flowing from reactor 10d to the regenerator may be substantially minimized or eliminated. Either one or both of the lockhopper systems 20 and 58 may be replaced by standpipes or mechanical conveyors if the prevailing pressure conditions permit.

As a result of the high temperatures employed in regenerator 30, substantial proportions of the alkali metal promoter content of the catalyst may be lost. This promoter may be advantageously replaced at any point of the system after the catalyst has been completely regenerated. For example, a suitable promoter solution such as an aqueous solution of a potassium hydroxide, carbonate or halide may be injected through line 60 into catalyst withdrawal pipe 54. A conventional steam-separating zone (not shown) may then be provided above line 60. Addition of the promoter at this or a similar point rather than in the synthesis reactors is of advantage since the catalyst at this point is free of oil and coke and the promoter may thus penetrate the catalyst much more effectively than if it is added to the catalyst in the synthesis reactor.

Other modifications will appear to those skilled in the art without deviating from the spirit of the invention.

As indicated above, the catalyst withdrawn from regenerator 30 may, as a result of overoxidation in regenerator 30 or of oxidation in the synthesis stage, contain more oxygen than desirable for an efficient operation of the synthesis stage, say more than about 10.0 to 15.0% by weight. In this case, the decarbonized catalyst may be subjected to a separate reduction treatment in equipment of the type illustrated in Figure IV.

Referring now to Figure IV, the system shown therein comprises a synthesis stage 10 and a regeneration stage 30 of the type illustrated in Figure III, like reference characters being used to identify like elements. The system, particularly the synthesis stage 10, is drawn in a simplified manner, only one reactor being shown as representative of a multi-reactor system of the type described above. The operation of the system of Figure IV is substantially the same as that of Figure III up to the point of withdrawing the regenerated catalyst from regenerator 30 through line 54.

Now, instead of cooling and returning the catalyst to the synthesis stage it is passed to catalyst reducer 70 which is preferably operated at an elevated pressure at least as high as that of the synthesis stage. Pressures of about 400–700 lbs. per sq. in. are generally suitable. The catalyst from line 54 is passed, therefore, through lockhopper system 58 to build up the desired pressure and thence directly to reducer 70. Since the reduction reaction is endothermic, the sensible heat of the decarbonized catalyst may be utilized to advantage in reducer 70 which may be operated at about 400°–1200° F., preferably 700°–1000° F., using hydrogen as the reducing agent.

Reducer 70 is preferably of the fluid type and has a construction similar to that of regenerator 30. Hydrogen, preheated to a temperature sufficiently high to maintain the desired reduction temperature in cooperation with the sensible heat of the catalyst, is supplied from line 72 through grid 74 to the bottom of reducer 70 to reduce and convert the catalyst therein into a dense, turbulent, fluidized mass of solids, substantially as described in connection with the regenerator 30. Reducer 70 is so designed as to allow for a catalyst residence time adequate for the desired degree of reduction. The proper amounts of hydrogen to be used depend on the amount of oxygen to be removed from the catalyst and may be readily determined by those skilled in the art for each given set of conditions. Reduced catalyst is withdrawn downwardly through line 76, cooled in cooler 80, enriched, if desired, with promoter supplied through line 78 and returned through gas feed line 7 to the final reactor of synthesis stage 10, if desired after carbiding, all substantially as described heretofore.

The hydrogen, after contacting the catalyst, passes through a gas-solids separation system, such as cyclone 82 provided with solids return pipe 84, and thence through line 86 to a heat exchanger 88 wherein it gives off some of its heat to a mixture of fresh and recycle hydrogen. The partially cooled spent hydrogen passes on to a cooler 90 wherein it is cooled sufficiently to condense the water which is finally knocked out of the gas in drum 92. The separated water along with suspended catalyst carry-over is returned through line 94 to regenerator 30.

The substantially dry gas is withdrawn from drum 92 through line 96 to which make-up hydrogen may be added through line 98. The resulting gas mixture is passed by recycle booster 100 through line 102 to heat exchanger 88, wherein it picks up heat from the exit hydrogen, and thence through line 104 and recycle heater 106 back to line 72 and reducer 70 at the desired preheat temperature for maintaining the endothermic reaction in reducer 70. Since inert gases will accumulate in the hydrogen recycle system just described, it is desirable to bleed part of these gases from the system. This may be done by way of line 108.

It will be understood that the system of Figure IV permits of substantially the same modifications as those described with reference to Figure III.

The invention will be further illustrated by the following specific examples.

EXAMPLE I

A multi-reactor hydrocarbon synthesis system designed for a daily production of 6,200 bbl. of gasoline, 565 bbl. of gas oil and 570 bbls. of alcohols and other oxygenated compounds is operated at the conditions given below using reduced pyrites ash promoted with 1.5 potassium carbonate as the catalyst in a fluidized bed.

*Synthesis conditions*

| | |
|---|---|
| Synthesis gas quantity, MMSCFD | 226.5 |
| Synthesis gas composition, volume percent: | |
| $H_2$ | 60.1 |
| CO | 33.6 |
| $CO_2$ | 1.3 |
| $N_2$ | 3.8 |
| $H_2O$ | .2 |
| $CH_4$ | 1.0 |
| Total | 100.0 |
| No. of reactors | 4 |
| Total catalyst in reactors—tons | 65 |
| Average catalyst residence time in reactors—hrs | 159.5 |
| Throughput, v./hr./w. ($H_2$+CO in fresh feed) | 72.5 |
| Recycle ratio (recycle to total fresh feed) | 1.62 |
| Synthesis reactor temperature, °F | 650 |
| Synthesis reactor pressure, p. s. i. g | 400 |
| CO conversion, percent on fresh feed | 98.0 |
| $H_2$ conversion, percent on fresh feed | 88.0 |

At these conditions about 974 bbls. of coke are formed per hour. The following table compares the condition and results of catalyst regeneration when applying series flow of catalyst in the reactors in accordance with the invention with those of regeneration when using conventional parallel flow of catalyst, substantially as described in connection with Figures I and II of the drawing.

| Catalyst Regeneration | A | B | C |
|---|---|---|---|
| Catalyst Flow Through Reactors | (1) | (2) | (1) |
| Total Catalyst Circulation Rate, Tons/Hr. of Fe | 2.83 | 4.1 | 4.1 |
| Percent Catalyst Having More Than 30% Carbon on Fe | 8.0 | 8.0 | 1.5 |
| Relative Quantity of Catalyst Disintegrated/Hr | 5.33 | 5.33 | 1.0 |
| Average Percent C on Iron (Carbon and Oxygen Free) | 17.25 | 11.9 | 11.9 |
| Average Percent O on Iron (Carbon and Oxygen Free) | 5.8 | 5.8 | 5.8 |
| Average Percent O on Regenerated Catalyst | 38.6 | 38.6 | 38.6 |
| Air for Regeneration, MSCFH | 211.0 | 251.5 | 251.5 |
| Temperature of Regeneration, °F | 1,000 | 1,0000 | 1,000 |
| Pressure of Regenerator, p. s. i. g | 5 | 5 | 5 |
| Residence Time in Regenerator, hrs | 25 | 25 | 25 |
| Relative Regenerator Hold-Up Volume | 1.0 | 1.45 | 1.45 |

[1] In series.
[2] In parallel.

The above data demonstrates that operation in accordance with the invention permits either a substantial reduction in catalyst circulation, air requirements and equipment size at a given coke content and disintegration of the catalyst (column A), or a substantial reduction in coke content and disintegration at a given catalyst circulation, air consumption and equipment size (column C).

EXAMPLE II

In order to illustrate the application of a separate reducing stage in accordance with the invention, a comparison of the conditions and results of the reduction of catalysts decarbonized as indicated in columns A and B of Example I are summarized in the table given below.

| Catalyst Reduction | A | B |
|---|---|---|
| Catalyst Flow Through Reactors | (1) | (2) |
| Total Catalyst to be Reduced, Tons/hr. of Fe | 2.83 | 4.1 |
| Hydrogen Fresh Feed Composition, Percent: | | |
| $H_2$ | 93.4 | 93.4 |
| Inerts | 6.6 | 6.6 |
| Hydrogen Fresh Feed, MSCFH as Hydrogen | 72.2 | 104.6 |
| Hydrogen Recycle Ratio (As Hydrogen) | 18.2 | 18.2 |
| Hydrogen Purge, MSCFH (As Hydrogen) | 20.25 | 29.4 |
| Hydrogen Purge Composition, Percent: | | |
| $H_2$ | 80.0 | 80.0 |
| Inerts | 20.0 | 20.0 |
| Temperature, °F | 900 | 900 |
| Pressure, p. s. i. g | 415 | 415 |
| Residence Time, Hrs | 2 | 2 |
| Hydrogen Preheat Temperature, °F | 1,000 | 1,000 |
| Percent O on Catalyst Charged (on Fe) | 38.6 | 38.6 |
| Percent O on Catalyst After Reduction (on Fe) | <1.0 | <1.0 |

[1] In series.
[2] In parallel.

The above data indicate savings of about 30% in the hydrogen requirement for the case of the present invention (column A).

While the foregoing description and exemplary operations have served to illustrate specific applications and results of the invention, other modifications obvious to those skilled in the art are within the scope of the invention. Only such limitations should be imposed on the invention as are indicated in the appended claims.

We claim:

1. In the process of converting gas mixtures containing CO and $H_2$ into hydrocarbons and oxygenated products in the presence of a dense, turbulent, fluidized mass of finely divided catalyst tending to carbonize at the conversion conditions, the improvement which comprises maintaining dense turbulent beds of said finely divided catalyst in a plurality of separately confined reaction zones at conversion conditions, supplying a gas mixture containing CO and $H_2$ in conversion proportions to each of said reaction zones, passing finely divided catalyst through said reaction zones in series, passing said gas mixture in parallel flow through said zones whereby each of said zones is contacted with substantially similar proportions of $H_2$ and CO, withdrawing carbonized catalyst from the last of said reaction zones passed through by catalyst, subjecting said withdrawn catalyst to a decarbonization reaction with an oxidizing gas to burn off carbon and returning decarbonized catalyst to the first of said reaction zones passed through by catalyst.

2. The process of claim 1 in which said catalyst is completely decarbonized in said decarbonization zone.

3. The process of claim 1 in which the total residence time of said catalyst in all of said reaction zones is insufficient to permit accumulation of carbonaceous deposits sufficient to interfere with a proper fluidization of said catalyst in said last reaction zone.

4. The process of claim 3 in which said accumulation is about 10–20% of carbon on said catalyst.

5. The process of claim 4 in which said residence time is about 75–200 hours.

6. The process of claim 1 in which said oxidizing gas is air.

7. The process of claim 1 in which said decarbonized catalyst is subjected to a reduction treatment with a reducing gas prior to its return to said first reaction zone.

8. The process of claim 1 wherein said conversion conditions in each of said reaction zones are maintained responsive to the catalyst activity in said zone.

9. The process of claim 5 wherein the throughput rate of said catalyst through said reactor is about 20 v./w./hr.

HOMER Z. MARTIN.
IVAN MAYER.

REFERENCES CITED

The following references are of record in the file of this patent:

UNITED STATES PATENTS

| Number | Name | Date |
|---|---|---|
| 2,224,048 | Herbert | Dec. 3, 1940 |
| 2,347,682 | Gunness | May 2, 1944 |
| 2,360,787 | Murphree et al. | Oct. 17, 1944 |
| 2,369,548 | Elian | Feb. 13, 1945 |
| 2,393,909 | Johnson | Jan. 29, 1946 |
| 2,409,235 | Atwell | Oct. 15, 1946 |
| 2,411,603 | Tyson | Nov. 26, 1946 |
| 2,425,555 | Nelson | Aug. 12, 1947 |
| 2,444,990 | Hemminger | July 13, 1948 |
| 2,445,796 | Millendorf | July 27, 1948 |
| 2,455,419 | Johnson | Dec. 7, 1948 |
| 2,467,802 | Barr | Apr. 19, 1949 |
| 2,467,803 | Herbst | Apr. 19, 1949 |
| 2,472,501 | Sweetser | June 7, 1949 |
| 2,482,284 | Michael et al. | Sept. 20, 1949 |